(12) United States Patent
Eriksson et al.

(10) Patent No.: US 8,554,431 B2
(45) Date of Patent: Oct. 8, 2013

(54) METHOD FOR ADAPTING GEAR SELECTION IN A VEHICLE

(75) Inventors: Anders Eriksson, Torslanda (SE); Anders Lindgren, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 1410 days.

(21) Appl. No.: 12/066,274

(22) PCT Filed: Aug. 31, 2006

(86) PCT No.: PCT/SE2006/001003
§ 371 (c)(1),
(2), (4) Date: Jul. 3, 2008

(87) PCT Pub. No.: WO2007/030057
PCT Pub. Date: Mar. 15, 2007

(65) Prior Publication Data
US 2009/0023551 A1   Jan. 22, 2009

Related U.S. Application Data

(60) Provisional application No. 60/596,215, filed on Sep. 8, 2005.

(51) Int. Cl.
*B60T 7/18* (2006.01)
(52) U.S. Cl.
USPC ............. 701/65; 180/338; 280/656; 303/123; 477/15
(58) Field of Classification Search
USPC ............. 701/1, 50, 51, 65, 70; 340/431, 456; 180/337, 338; 477/15, 16; 280/406.1, 280/406.2, 407, 407.1, 656, 789; D12/101, D12/162; 303/123
See application file for complete search history.

(56) References Cited

U.S. PATENT DOCUMENTS 4,850,249 A * 7/1989 Kirstein ............. 477/97
4,864,874 A * 9/1989 Hafner ............. 73/862.382

(Continued)

FOREIGN PATENT DOCUMENTS

| DE | 10242112 A1 | 4/2004 |
| EP | 0787930 A2 | 8/1997 |

(Continued)

OTHER PUBLICATIONS

Supplementary European Search Report for corresponding EP 06 78 4135.

(Continued)

*Primary Examiner* — Thomas Black
*Assistant Examiner* — Ce Li
(74) *Attorney, Agent, or Firm* — WRB-IP LLP

(57) ABSTRACT

A method for adapting gear selection in a vehicle, the vehicle including an engine with an engine output shaft connected to an automated mechanical transmission via a clutch, a transmission output shaft connected to at least one driven wheel of the vehicle, an arrangement for registering whether a towed vehicle is connected to said vehicle, and at least one control unit for receiving input signals including signals indicative of the towed vehicle connection, and for processing the signals in accordance with programmed logic rules to issue gear selection command output signals to the transmission for gear shifting, where the control unit, when sensing that a towed vehicle has been connected to the vehicle, changes an originally selected first gear to a lower second gear having a higher starting gear ratio compared to the first gear. The towed vehicle connection registering arrangement registers at least bounce from when the vehicle bounces into the towed vehicle for connecting the towed vehicle to the vehicle. A more sure registration of whether a towed vehicle is connected to the vehicle or not is obtained.

6 Claims, 1 Drawing Sheet

(56) References Cited

U.S. PATENT DOCUMENTS

| | | | |
|---|---|---|---|
| 5,329,451 A | 7/1994 | Notsu | |
| 5,884,204 A * | 3/1999 | Orbach et al. | 701/50 |
| 6,524,221 B2 | 2/2003 | Nishimura | |
| 2001/0023384 A1 * | 9/2001 | Nishimura | 701/51 |
| 2001/0027148 A1 * | 10/2001 | Nishimura | 477/92 |
| 2006/0187008 A1 * | 8/2006 | Yu | 340/431 |
| 2006/0187012 A1 * | 8/2006 | Haskew | 340/440 |

FOREIGN PATENT DOCUMENTS

| | | |
|---|---|---|
| EP | 1138985 A2 | 10/2001 |
| JP | 2003287116 A | 10/2003 |

OTHER PUBLICATIONS

International Search Report for corresponding International Application PCT/SE2006/001003.

* cited by examiner

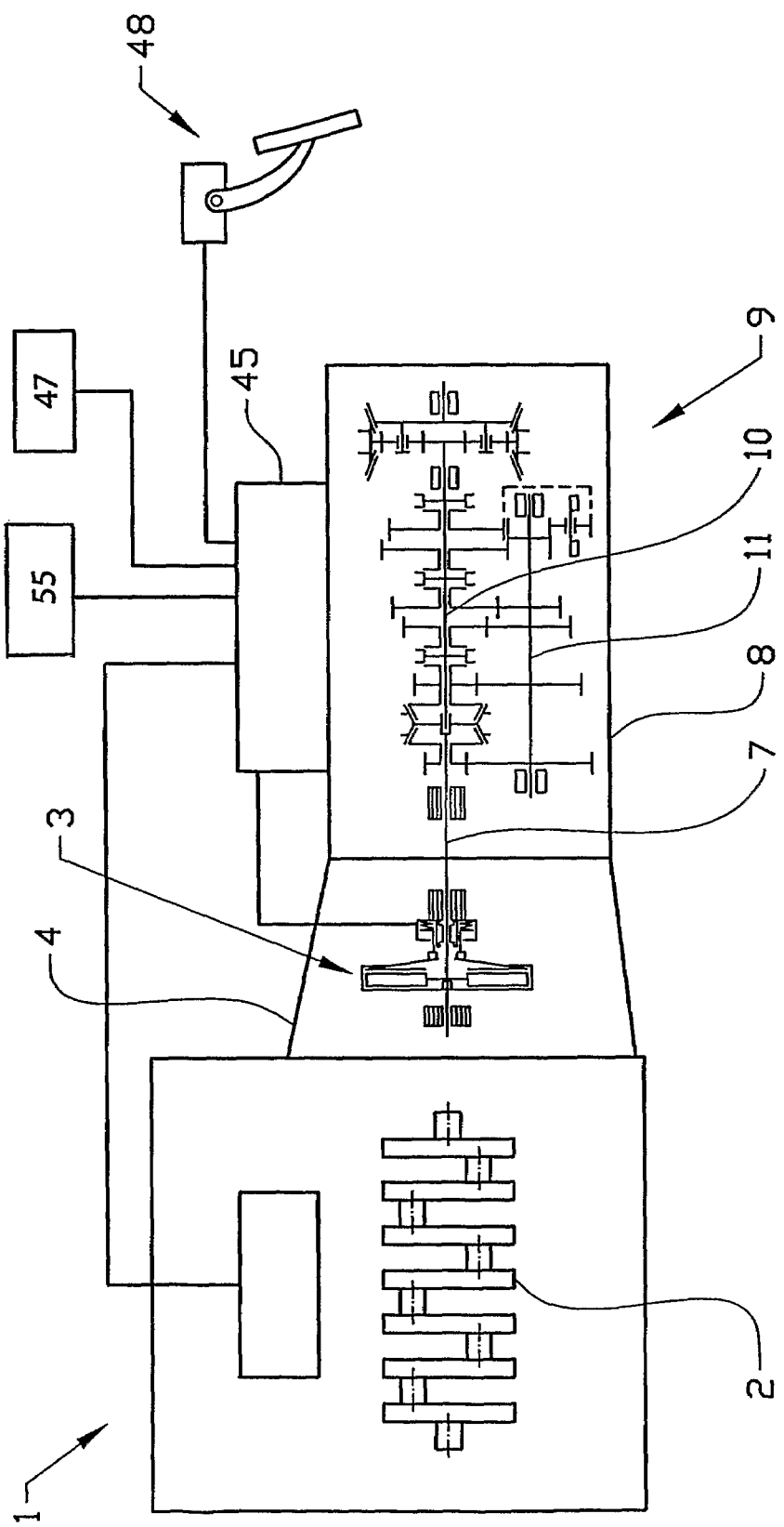

METHOD FOR ADAPTING GEAR SELECTION IN A VEHICLE

BACKGROUND AND SUMMARY

The present application is the U.S. national stage application of PCT/SE2006/001003, filed Aug. 31, 2006, which claims priority to U.S. Provisional Application No. 60/596,215, filed Sep. 8, 2005.

The present invention relates to a method for automatically registering if a towed vehicle, such as trailer, semi-trailer or the like is connected to a towing vehicle and based thereupon, adjusting gear selection or starting gear selection.

Automatic transmissions of the Automatic Mechanical Transmissions (AMT) type have become increasingly common in heavy-duty vehicles as microcomputer technology has continued to advance and has made it possible, with a control computer and a number of control elements, for example servo motors, to precision-control the engine speed, the connection and disconnection, of an automated clutch between engine and gearbox and coupling members of the gearbox, relative to one another, so that smooth gearshift is always obtained at the correct engine revolutional (rev) speeds. The advantage with this type of automatic transmission compared to a traditional automatic transmission based on a set of planetary gears and with a hydrodynamic torque converter on the input side is firstly that, particularly as regards use in heavy vehicles, it is simpler and more robust and can be produced at substantially lower cost, and secondly that it has higher efficiency, which enhances the prospect for lower fuel consumption.

The automatic mechanical transmissions of the type mentioned above can adjust the selection of the starting gear dependent on the gross weight of the vehicle and road inclination. The gross weight can for example be sensed by measuring the air pressure in an air spring suspension system of a vehicle. The road inclination can be sensed by an inclinometer, which can be for example of the piezoelectric type, as well as other sensor types to achieve the invention herein below disclosed.

When a vehicle is used as a towing vehicle there are several known systems for registering whether a towed vehicle is connected to the towing vehicle or not. The weight of a towed vehicle can have a great effect on the starting performance of the vehicle and, thus, it is important to consider the total gross weight of the towing and the towed vehicles. According to one known technique the signal that indicates that a towed vehicle is connected is used as an input to add an estimated towed vehicle weight to the total gross weight of the towing vehicle and towed vehicle. This signal is often based on sensing some kind of electrical change (current or voltage) in the electrical system of the vehicle, when an electrical system of the towed vehicle is plugged into the vehicle electrical system. In such towed vehicle registering systems there can be registration problems if the towed vehicle for some reason does not have a working electrical system or simply does not have an electrical system.

The total gross weight together with information about road inclination gives an indication of the current vehicle travel resistance. The information about the current vehicle travel resistance is used by a transmission control unit arranged in the vehicle for selecting the right starting gear. The estimated towed vehicle weight is a compromise, which sometimes can give the right starting gear and sometimes a too low start gear ratio which can result in an unsuccessful vehicle take off. The travel resistance of the towed vehicle can depend on how loaded the towed vehicle is or, if it has stood still for a while and has maybe sunken down into muddy ground or possibly the brakes have become rusted thus increasing the travel resistance at start is experienced.

U.S. Pat. No. 6,524,221 discloses a start control device for an automatic transmission, which partly solves mentioned problems. Said device first learns two different starting gears, one for when a trailer is connected and one when no trailer is connected. When the control device is sensing that a trailer is connected it selects the predetermined starting gear with the highest gear ratio, and the opposite when no trailer is connected. Two ways of detecting trailer connected are exemplified; through the brake light connection by sensing some kind of voltage alteration and through an optical sensor in the mechanical connection that connects the vehicle and the trailer.

JP2003-287116 discloses another example of start control device for an automatic transmission capable of determining whether a trailer is being towed or not towed and starting a vehicle according to load conditions. This transmission control device comprises a control means 1 for controlling the gear shift of a multi-stage transmission, a trailer connection detection means 3 for detecting the connection or non-connection of the trailer, a gear position detection means 4, and a gear shift control means 5. The control means 1 selects a proper start gear based on outputs from the trailer connection detection means 3 and output signals from the gear position detection means 4, and controls the gear shift control means 5 so that the vehicle can start at the proper start stage.

It is desirable to present alternative solutions to the problem of registering whether a towed vehicle is connected and to increase the reliability of the automatic system.

In at least one embodiment, an aspect of the invention takes the form of a method for selecting a gear in a vehicle. The vehicle comprises (includes, but is not necessarily limited to) an engine with an engine output shaft connected to an automated mechanical transmission via a clutch; a transmission output shaft connected to at least one driven wheel of the vehicle; means for registering whether a towed vehicle is connected to said vehicle; and at least one control unit for receiving input signals including signals indicative of said towed vehicle connection, and for processing said signals in accordance with programmed logic rules to issue gear selection command output signals to said transmission for gear shifting, where the control unit, when sensing that a towed vehicle has been connected to the vehicle, changes an originally selected first gear to a lower second gear having a higher starting gear ratio compared to said first gear. An aspect of the invention is characterized in that said towed vehicle connection registering means registers at least bounce from when said vehicle bounces into said towed vehicle for connecting the towed vehicle to said vehicle. An advantage of the disclosed method when conducted according to the invention teachings is that a more sure registration of whether a towed vehicle is connected to the vehicle is obtained.

According to one embodiment of the method of an aspect of the invention, said towed vehicle connection registering means comprises a rev speed sensor for sensing rev speed of a shaft rotatably connected to said vehicle wheel, and programmed logic rules in said control unit for registering said bounce in the form of rev speed bounces and determining if a towed vehicle is connected to the towing vehicle.

According to another embodiment of the method of an aspect of the invention, said towed vehicle connection registering means comprises a piezoelectric sensor and programmed logic rules in said control unit for registering said bounce and determining if a towed vehicle is connected to the towing vehicle.

According to another embodiment of the method of an aspect of the invention, the output from an accelerometer is utilized for detecting changes in vehicle acceleration/retardation that are indicative of a towed vehicle being connected and thereby the accelerometer together with appropriate software constitute the "registering means." Thus, said accelerometer can be used to detect a bounce that typically occurs when the vehicle bounces into the vehicle to be towed.

According to another embodiment of the method of an aspect of the invention, the towed vehicle connection registering means is an air actuated draw coupling for connecting the towed vehicle and includes programmed logic rules in the control unit for registering opening and closing of the draw coupling when the vehicle is being connected to the vehicle.

According to another embodiment of the method of an aspect of the invention, said towed vehicle connection registering means comprises a combination of at least one of: (a) a rev speed sensor; (b) a piezoelectric sensor; (c) an accelerometer, and at least one of: (d) an air actuated draw coupling; (e) an air system pressure sensor; and (f) an electrical characteristic sensor, and programmed logic rules in said control unit for registering changes indicative of a towed vehicle having been interconnected with the towing vehicle. With the use of two or more of the mentioned different ways to register if a towed vehicle is connected the reliability of the system increases.

According to one embodiment of the method of an aspect of the invention, the second gear (when a towed vehicle is connected) is a gear at least two gear steps lower than a gear correspondent to the first gear. At least two gear steps below gives secured vehicle starting performance.

As mentioned above, there can be a problem in registering whether a towed vehicle is connected to the towing vehicle if the towed vehicle for some reason for example does not have a working electrical system or simply does not have an electrical system. Inventive features related to towed vehicle connection registering means as described above solve this problem.

BRIEF DESCRIPTION OF THE DRAWING

The present invention will be described in greater detail below with reference to the accompanying drawing which, for the purpose of exemplification, shows further preferred embodiments of the invention and also the technical background, and in which:

FIG. 1 diagrammatically illustrates one embodiment of the present invention.

DETAILED DESCRIPTION

In one embodiment, the vehicle is equipped with an internal combustion engine 1, for example a diesel engine, with a crankshaft 2 which is coupled to a single-disk dry plate clutch 3, which is enclosed in a clutch case 4. The crankshaft 2 is connected, non-rotatably, to an input shaft 7, which is rotatably mounted in the housing 8 of a gearbox 9. Also rotatably mounted in the gearbox housing 8 are a main shaft 10 and a counter shaft 11. A gear wheel is rotatably mounted on the input shaft 7 and can be locked on the shaft with the aid of a synchronizing device provided with a coupling sleeve, which is mounted in a non-rotatable but axially displaceable manner on a hub connected, non-rotatably, to the output shaft. With the aid of the coupling sleeve, a gear wheel rotatably mounted on the main shaft can be locked relative to the input shaft 7. With the coupling sleeve in a middle position, both of the gearwheels are disengaged from their respective shafts. The above mentioned gear wheels, together with the synchronizing device and the coupling sleeve, form a splitter gear.

Disposed in a rotationally secure manner on the counter shaft 11 are further gear wheels, each of which engage with a respective gear wheel rotatably mounted on the main shaft 10, which latter gear wheels can be locked on the main shaft 10 with the aid of further coupling sleeves. An output end of the main shaft is arranged to, via a propeller shaft, drive at least a pair of wheels.

All coupling sleeves are displaceable with the aid of servo elements, which can be pneumatically operated piston cylinder devices of the type utilized in a transmission of the kind described above and which is marketed under the name I-SHIFT.

A control unit 45 is arranged to control the different pneumatically operated piston cylinder devices for engaging different gear ratios between the input shaft and the output shaft of the transmission. The control unit 45 is programmed with at least one gear shift strategy, for example optimized for a highway condition.

The torque delivered from the engine 1 is controlled by a throttle control 48 (usually an accelerator pedal) in a known manner. The accelerator pedal position is obtained from an angle sensor. The control unit 45 also controls fuel injection, (i.e. the engine speed and torque) in dependence on the accelerator pedal position, as well as the air supply to pneumatic piston-cylinder devices, by means of which, for example, the clutch and the synchronized splitter gear are regulated.

Gear selections and shift decisions are made by the control unit 45 based on certain measured and/or calculated parameters such as vehicle speed, engine speed, rate of change of vehicle speed, rate of change of engine speed, throttle control position, rate of change of throttle control position, actuation of a vehicle braking system, currently engaged gear ratio and the like are known from prior art. In the gear selection programmed logic rules, programmed logic for selecting a starting gear is included. Based on sensed vehicle travel resistance before a vehicle start, the control unit 45 selects an appropriate starting gear. The control unit 45 calculates the vehicle travel resistance based on sensor signals coming from, for example, one or several pressure sensors in an air spring suspension system of the vehicle, and/or from an inclinometer in the vehicle for sensing road inclination. The inclinometer can be for example of the piezoelectric type. The pressure sensor(s) measures the gross weight of the vehicle. The means for sensing vehicle travel resistance are indicated by the reference numeral 55 in FIG. 1.

The control unit 45 in the vehicle is, according to one embodiment of the invention, programmed to sense that a towed vehicle has been connected to the vehicle, and as a result of this, changes an originally first selected starting gear ratio to a second lower starting gear ratio. In a further developed embodiment of the invention, the control unit 45 is programmed to change the first starting gear ratio to a gear at least two gear steps lower than the gear corresponding to the first starting gear ratio.

In an embodiment of the invention, the signal that indicates that a towed vehicle has been connected comes from a rev speed sensor for sensing rev speed of a shaft, which shaft is rotatably connected to a driven vehicle wheel. The control unit 45 is programmed to sense rev speed bounce through the speed sensor when the vehicle bounces into the towed vehicle for connecting the towed vehicle to the vehicle. The bounce produces a rev speed change. One or more predetermined rev speed changes that typically occur when the vehicle bounces into a towed vehicle are stored in a memory of the control unit 45. The control unit 45 compares measured information with stored information and in this manner recognizes when the vehicle bounces into a towed vehicle. The shaft can for example be an input or output shaft of the transmission.

In another embodiment of the invention, the signal that indicates that a towed vehicle has been connected comes from a piezoelectric sensor which senses when the vehicle bounces into the towed vehicle for connecting the towed vehicle to the towing vehicle. The control unit 45 is programmed to sense the bounce through the piezoelectric sensor. One or more predetermined voltage changes, that typically occur in the piezoelectric sensor when the vehicle bounces into a towed vehicle, are stored in a memory of the control unit 45. The control unit 45 compares measured information with stored information and in this manner recognizes when the vehicle bounces into a towed vehicle.

In one embodiment of the invention, the signal that indicates that a towed vehicle has been connected by—registering a bounce (according to at least one of the embodiments above), can be combined with a signal from an air actuated (pneumatic) draw coupling for connecting a towed vehicle to the towing vehicle. The control unit 45 is programmed to sense opening and closing of the draw coupling when the towed vehicle is being connected and the control unit 45 interprets such a happening as a towed vehicle being connected to the towing vehicle.

In one embodiment of the invention, the signal that indicates that a towed vehicle has been connected by registering a bounce (according to at least one of the embodiments above), can be combined with a signal from a pressure sensor in an air pressure system of the vehicle. The control unit 45 is programmed to sense a pressure change that occurs when the vehicle air pressure system is being connected to an air pressure system of the towed vehicle. One or more predetermined pressure changes that typically occur in the air pressure system of the vehicle when the vehicle is being connected to the towed vehicle is stored in a memory of the control unit 45. The control unit 45 compares measured information with stored information and in this manner recognizes when the towing vehicle has been connected with the towed vehicle.

In one embodiment of the invention the signal that indicates that a towed vehicle has been connected by registering a bounce (according to at least one of the embodiments above), can be combined with a signal from an electrical system of the vehicle. The control unit 45 is programmed to sense some kind of electrical change (for example, current or voltage) when an electrical system of the towed vehicle is plugged into the electrical system of the towing vehicle. One or more predetermined electrical changes that typically occur when the electrical system of the vehicle is connected to the electrical system of the towed vehicle is stored in a memory of the control unit 45. The control unit 45 compares measured information with stored information and in this manner recognizes when the two electrical systems have been connected.

Two or more of the different connection registering means mentioned in the embodiments above can be combined in one vehicle, thus creating a more secure system for registering whether a towed vehicle is connected. The different connection registering means are indicated by the reference numeral 47 in FIG. 1.

In another embodiment of the invention at least one of the bounce registering embodiments as above can be combined with a system which registers the vertical movements of preferably several wheels of the vehicle. Suspension systems, which registers vertical wheel movements is known art. According to the invention the control unit 45 can be programmed to register if the bounce occurs at approximately the same time as one or several of the wheels suddenly makes a relatively rapid and big vertical movement or not. In this way a bounce coming from a road obstacle can be effectively distinguished from the bounce coming from when said vehicle bounces into said towed vehicle for connecting the towed vehicle to said vehicle. Thus, a more sure registration of whether a towed vehicle is connected to the vehicle is obtained.

In a further embodiment of the invention at least one of the bounce registering embodiments as above can be combined with a functionality of said control unit 45, which functionality registers if said vehicle has traveled relatively slowly and backwards when said bounce was registered, i.e. a, for the vehicle, typical driving for when a towed vehicle is going to be connected. In this way a bounce coming from other driving conditions than a typical condition for connecting the towed vehicle to said vehicle can be distinguished. Thus, a more sure registration of whether a towed vehicle is connected to the vehicle is obtained.

The number of control units utilized to perform the above mentioned embodiments of the invention can be one or several. For example, a control unit that controls vehicle lights can send out a signal indicative of a towed vehicle being connected to the towing vehicle and another control unit can receive that signal and control the transmission actions accordingly.

The invention should not be deemed to be limited to the embodiments described above, but rather a number of further variants and modifications are conceivable within the scope of the following patent claims.

The invention claimed is:

1. A method for adapting gear selection in a vehicle, the vehicle comprising: an engine with an engine output shaft connected to an automated mechanical transmission via a clutch, a transmission output shaft connected to at least one driven wheel of the vehicle, means for registering whether a towed vehicle is connected to the vehicle, and at least one control unit, the method comprising:
    receiving input signals with the control unit including signals indicative of the towed vehicle connection;
    processing the signals with the control unit in accordance with programmed logic rules to issue gear selection command output signals to the transmission for gear shifting;
    sensing with the control unit that a towed vehicle has been connected to the vehicle;
    changing, upon the control unit sensing that the towed vehicle has been connected to the vehicle, an originally selected first gear to a lower second gear having a higher starting gear ratio compared to the first gear; and
    registering, with the towed vehicle connection registering means, at least one change of a plurality of stored changes in a memory of the control unit, the stored changes being changes tending to occur when the vehicle bounces into the towed vehicle for connecting the towed vehicle to the vehicle;
    wherein the towed vehicle connection registering means comprises a rev speed sensor for sensing rev speed of a shaft rotatably connected to the vehicle wheel, and programmed logic rules in the control unit for registering the bounce in the form of rev speed bounces and determining if a towed vehicle is connected to the towing vehicle.

2. The method as recited in claim 1 wherein the towed vehicle connection registering means comprises a piezoelectric sensor and programmed logic rules in the control unit for registering the change and determining if a towed vehicle is connected to the towing vehicle.

3. The method as recited in claim 1, wherein the towed vehicle connection registering means comprises an accelerometer and programmed logic rules in the control unit for registering the change and determining if a towed vehicle is connected to the towing vehicle.

4. The method as recited in claim 1, comprising connecting a towed vehicle with an air actuated draw coupling of the towed vehicle connection registering means and registering opening and closing of the draw coupling via programmed logic rules in the control unit when the vehicle is being connected to the vehicle.

5. The method as recited in claim 1, wherein the towed vehicle connection registering means comprises at least one of:
   a piezoelectric sensor;
   an air actuated draw coupling;
   an accelerometer, and at least one of:
   an air actuated draw coupling;
   all air system pressure sensor; and
   an electrical characteristic sensor, and
   programmed logic rules in the control unit for registering changes indicative of a towed vehicle having been interconnected with the towing vehicle.

6. The method as recited in claim 1, wherein the second starting gear is a gear at least two gear steps lower than a gear correspondent to the first starting gear.

* * * * *